United States Patent [19]
Petersen et al.

[11] Patent Number: 5,844,361
[45] Date of Patent: *Dec. 1, 1998

[54] FIELD EMISSION DISPLAY HAVING A STABILIZED PHOSPHOR

[75] Inventors: Ronald O. Petersen, Phoenix, Ariz.; Troy A. Trottier, Gainesville, Fla.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 764,172

[22] Filed: Dec. 13, 1996

[51] Int. Cl.$^6$ .................... H01J 1/62; B32B 5/16
[52] U.S. Cl. .................. 313/495; 313/496; 313/497; 252/301.45
[58] Field of Search .............. 252/301.4 R, 301.45, 252/301.65, 301.9 R; 428/403; 427/212, 220; 313/495, 496, 497, 336

[56] References Cited

U.S. PATENT DOCUMENTS

| | | | |
|---|---|---|---|
| 3,560,783 | 2/1971 | Shortes | 313/467 |
| 3,607,371 | 9/1971 | Haynes et al. | 252/301.4 R |
| 4,263,339 | 4/1981 | Fischer | 252/301.6 S |
| 4,690,832 | 9/1987 | Yale | 252/301.4 S |
| 5,418,062 | 5/1995 | Buidd | 252/301.4 S |

*Primary Examiner*—Sandra L. O'Shea
*Assistant Examiner*—Joseph Williams
*Attorney, Agent, or Firm*—Kathleen Anne Tobin; Eugene A. Parsons

[57] ABSTRACT

A field emission display (100, FIG. 1) having a stabilized phosphor (110, FIG. 1) includes a cathode plate (130, FIG. 1) having a plurality of field emitters (160, FIG. 1), an anode plate (120, FIG. 1) opposing the cathode plate (130, FIG. 1), and a stabilized sulfide phosphor disposed on the anode plate (120, FIG. 1) to receive electrons from the plurality of field emitters (160, FIG. 1). The stabilized sulfide phosphor includes a sulfide phosphor core containing vacuum-unstable sulfur and a stabilized surface made from a more thermodynamically stable material, which is more thermodynamically stable against outgassing than the vacuum-unstable sulfur of the sulfide phosphor core. The stabilized phosphor (110, FIG. 1) can alternatively include a stabilized oxide phosphor that has an oxide phosphor core containing vacuum-unstable oxygen and a stabilized surface made from a more thermodynamically stable material, which is more thermodynamically stable against outgassing than the vacuum-unstable oxygen of the oxide phosphor core.

20 Claims, 2 Drawing Sheets

FIELD EMISSION DISPLAY HAVING A STABILIZED PHOSPHOR

FIELD OF THE INVENTION

The present invention relates, in general, to the area of field emission displays and more particularly to a field emission display having a stablized phosphor.

BACKGROUND OF THE INVENTION

Phosphors for vacuum fluorescent displays (VFDs) are known in the art. One such phosphor, suitable for use in field emission displays (FEDs), includes ZnO, which is one of the most efficient prior art phosphors. For low voltage FEDs, which are operated at a potential difference between the anode and the cathode plates within a range of about 200–10,000 volts, high efficiency is crucial. Thus, ZnO is the phosphor of choice for use in FEDs. However, ZnO only emits a blue-green light. To fabricate polychromatic FEDs, other phosphors must be employed. Many of the other prior art phosphors which provide the high efficiencies required for use in FEDs are sulfur-containing phosphors, such as $Y_2O_2S$:Eu, which emits red light upon electron excitation.

Sulfur-containing phosphors release gaseous sulfur-containing compounds upon electron excitation. Gaseous sulfur is known to contaminate the materials comprising the cathodes of FEDs. Thus, sulfur-containing phosphors are not typically employed in FEDs or other displays wherein sulfur contamination is an issue.

Another consideration in phosphor selection is the energy of impinging electrons. For FEDs operated at a potential difference above about 4000 volts, the potential of the anode plate is maintained by forming a conductive layer on the electron-receiving surface of the phosphor. This conductive layer bleeds off negative charge and, thereby, maintains the highly positive potential of the anode. Such a conductive layer is not suitable for use in FEDs which are operated at potential differences below about 4000 volts because the electrons lose an excessive fraction of their energy upon traversing the conductive layer. Other schemes for maintaining the anode potential for these low voltage operations include admixing a conductive powder with the emissive phosphor material. These schemes still suffer from an appreciable loss in efficiency due to the reduced volume fraction of emissive material within the phosphor mixture.

Accordingly, there exists a need for an improved high efficiency phosphor, suitable for use in a field emission display, which provides a variety of emission wavelengths, which does not produce sulfur contamination, and which maintains the highly positive potential of an FED anode.

BRIEF DESCRIPTION OF THE DRAWINGS

Referring to the drawings.

DESCRIPTION OF THE PREFERRED EMBODIMENTS

Figure 1:
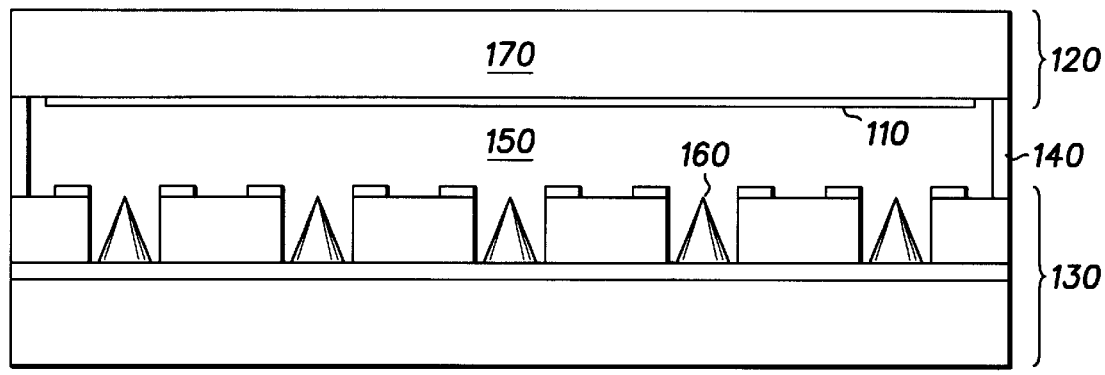
FIG. 1 is a cross-sectional, schematic representation of a field emission display including a stabilized sulfide or oxide phosphor in accordance with the present invention.

Referring now to FIG. 1 there is depicted a cross-sectional view and schematic representation of a field emission display (FED) 100 including a stabilized phosphor 110, in accordance with the present invention. FED 100 includes an anode plate 120 and a cathode plate 130, which are spaced apart by a spacer frame 140. An interspace region 150 between anode plate 120 and cathode plate 130 is evacuated to a pressure less than about $10^{31\ 6}$ Torr. A plurality of field emitters 160 are formed on a surface of cathode plate 130. Field emitters 160 may include Spindt tips or other electron emissive configurations and materials, which are known to one skilled in the art. Anode plate 120 includes a transparent substrate 170, being made from a transparent material such as glass, upon which stabilized phosphor 110 is disposed. In the operation of FED 100, field emitters 160 are selectively addressed and caused to emit electrons. The emitted electrons traverse interspace region 150 and are received by portions of stabilized phosphor 110, which are thereby excited to emit light. As is described in greater detail below, stabilized phosphor 110 exhibits negligible sulfur outgassing and/or negligible oxygen outgassing, thereby preventing sulfur contamination of the materials of cathode plate 130 and reducing the rate of degradation of stabilized phosphor 110.

Figure 2:
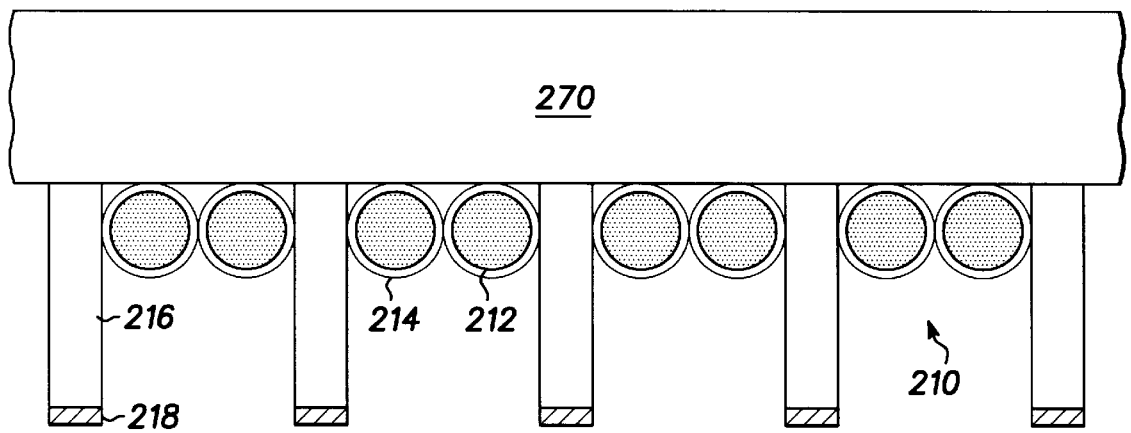
FIGS. 2–5 are greatly enlarged, cross-sectional views of embodiments of an anode including a stabilized sulfide or oxide phosphor in accordance with the present invention.

Referring now to FIG. 2, there is depicted a greatly enlarged, cross-sectional view of an anode plate 220 including a stabilized sulfide phosphor 210, in accordance with the present invention. Stabilized sulfide phosphor 210 is disposed upon a transparent substrate 270 and adhered thereto by adhesion means known to one skilled in the art, including static charge adhesion and inorganic binders, such as potassium silicate. When anode plate 220 is incorporated in a display, stabilized sulfide phosphor 210 is bombarded with primary electrons and has a high positive potential. To maintain the high positive potential, the charge must be removed. In this particular embodiment, stabilized sulfide phosphor 210 is not sufficiently conductive to provide a conduction path for bleeding off charge. Charge is removed by the emission of secondary electrons from stabilized sulfide phosphor 210, which are collected and conducted away by a plurality of secondary electron collectors 216. The combination of stabilized sulfide phosphor 210, transparent substrate 270, and secondary electron collectors 216 comprises anode plate 220, suitable for use in a field emission display, such as FED 100 described with reference to FIG. 1. Stabilized sulfide phosphor 210 includes a sulfide phosphor core 212 and a stabilized surface 214, which covers sulfide phosphor core 212. Sulfide phosphor core 212 contains vacuum-unstable sulfur which is prevented from outgassing due to the dead layer comprised by stabilized surface 214. Stabilized surface 214 does not include vacuum-unstable sulfur and does include a material which is more thermodynamically stable against outgassing than the vacuum-unstable sulfur constituent of sulfide phosphor core 212, thereby mitigating sulfur outgassing during electronic bombardment of stabilized sulfide phosphor 210. Stabilized sulfide phosphor 210 is made by first providing a cathodoluminescent sulfide phosphor. Cathodoluminescent sulfide phosphors are well known in the art and include zinc sulfide (ZnS), rare earth oxysulfides (the formula for which is $R_2O_2S$:A, wherein R is a host being selected from the group consisting of Sc, Y, La, Gd, Lu, and combinations thereof and A is an activator being selected from the group consisting of Eu, Sm, Pr, Dy, Tb, Ho, Er, Tm, Nd, and Yb), and alkaline earth thiogallates (the formula for which is AE(Ga, 3A)S:A, wherein AE is an alkaline earth element being selected from the group consisting of Mg, Ca, Sr, Ba, and combinations thereof; 3A is Al or In; and A is an activator being selected from the group consisting of Eu, Ce, and Mn). The choice of cathodoluminescent sulfide phosphor depends upon desired wavelength of the emitted light, cost considerations, availability, and the like. The bonds which bind the constituent sulfur within these materials are known to break easily at the solid-vacuum interface upon electron bombardment, thereby producing gaseous sulfur-containing compounds. Stabilized surface 214 shields the constituent sulfur within stabilized sulfide phosphor 210 from the vacuum conditions. Stabilized surface 214 is formed by either reacting the cathodoluminescent sulfide phosphor with a material which alters the surface of the cathodoluminescent sulfide phosphor, so that it becomes more thermodynamically stable against outgassing than the vacuum-unstable sulfur constituent of the cathodoluminescent sulfide phosphor, or by encapsulating the cathodoluminescent sulfide phosphor with an impervious outer coating of a thermodynamically stable material. One type of surface modification process results in substitution, at the surface of the cathodoluminescent sulfide phosphor, of a more thermodynamically stable constituent for the vacuum-unstable sulfur. For example, in the preferred embodiment of the present invention, the vacuum-unstable sulfur at the surface of the cathodoluminescent sulfide phosphor is replaced by a more stable anions. Suitable anions include, but are not limited to, the following: phosphate, gallate, chromate, vanadate, and silicate. The method utilized for reacting or encapsulating the cathodoluminescent sulfide phosphor depends upon the physical state of the source of the stabilizing anion. Typically, the cathodoluminescent sulfide phosphor is available in powdered form. The source of the stabilizing anion is typically available as a gas or liquid. A gaseous source of a stabilizing anion may be reacted with the cathodoluminescent sulfide phosphor by chemical vapor deposition or metal organic chemical vapor deposition. The reaction is performed for a time suitable for the stabilizing anions to diffuse into, and react with, the surface of the cathodoluminescent sulfide phosphor, displacing sulfur and forming the more stable oxide type. For example, a mixture of hydrogen and hydrogen phosphide reacts with the surface of a metal sulfide phosphor to form a metal phosphide surface, which, upon exposure to air, is subsequently converted to a metal phosphate, thereby forming a stabilized sulfide phosphor having a sulfide phosphor core and a stabilized surface including metal phosphate. A liquid source of a stabilizing anion may be reacted with, or used to encapsulate, the cathodoluminescent sulfide phosphor by spray pyrolysis, sol-gel vapor coating, or by mixing the sulfide phosphor in a solution that reacts forming the stable oxide. For example, a powdered form of ZnS cathodoluminescent sulfide phosphor may be mixed in a phosphoric acid solution. A suitable set of reaction conditions include: an acid solution pH within a range of 4–6, a reaction temperature within a range of 25–80 degrees Celsius, and a reaction time within a range of 60–120 minutes. These conditions are suitable for forming stabilized surface 214 having a thickness within a range of 0.01–0.2 micrometers; stabilized surface 214 includes $ZnPO_4$, the phosphate having replaced the sulfur, and sulfide phosphor core 212 includes ZnS. The solid at the solid-vacuum interface only includes $ZnPO_4$, the bonds of which are stable upon electron bombardment in the vacuum conditions, thereby precluding gaseous emissions deleterious to cathode materials. In the particular embodiment of FIG. 2, stabilized surface 214 is non-conductive and has favorable secondary electron emission characteristics. That is, upon electron bombardment, stabilized surface 214 emits secondary electrons, which, if removed, allow anode plate 220 to maintain a high positive potential, such as is necessary for use in a field emission display. In this particular embodiment, secondary electron removal is accomplished by the collection of secondary electrons at plurality of secondary electron collectors 216. Secondary electron collectors 216 are formed by using thick film technology. For example, first, a layer of low-melting-point glass powder, such as product number SCB-2 vitreous glass produced by SEM-COM, Inc., is deposited onto transparent substrate 270 by silk screening, casting, or coating. Thereafter, the low-melting-point glass is sintered or melted. The glass is patterned and etched to create a plurality of wells. The depth of the wells is greater than the predetermined thickness of the layer of stabilized sulfide phosphor 210, which is thereafter deposited into the wells. Secondary electron collectors 216 further include planar surfaces parallel to the major surface of transparent substrate 270. Upon these planar surfaces is deposited a conductive film 218, which may be made from aluminum. During the operation of anode plate 220, electrons are received by stabilized surface 214 of stabilized sulfide phosphor 210. The electrons traverse stabilized surface 214, which comprises a dead layer, causing electrons to lose a minimal amount of energy, believed to be only about 300 eV. In a typical field emission display, for example, electrons arrive at stabilized sulfide phosphor 210 having an energy within a range of about 3000–5000 eV, so that the drop in phosphor efficiency due to the election energy loss at stabilized surface 214 is minimal. Thereafter, the electrons excite the photoactive centers of sulfide phosphor core 212, causing them to emit light. As a result, secondary electrons are emitted by stabilized sulfide phosphor 210. These secondary electrons are intercepted and conducted away by conductive film 218. Alternatively, the low-melting-point glass may be made conductive through the addition to the glass of a conductive material, such as silver, gold, copper, nickel, tin, iron, palladium, indium, ruthenium, and their oxides. Alternatively, the glass may include a conductive vanadium glass which may also be doped in the manner described above. The wells may be formed by including photosensitive binders in the thick-film paste, photoexposing the dried material, and removing material from the predetermined locations of the wells. DuPont manufactures a silver-doped glass paste, called "Fodel", which is photosensitive and suitable for making secondary electron collectors 216 in this manner. Other means for removing charge from a stabilized phosphor, in accordance with the present invention, may be employed.

Figure 3:
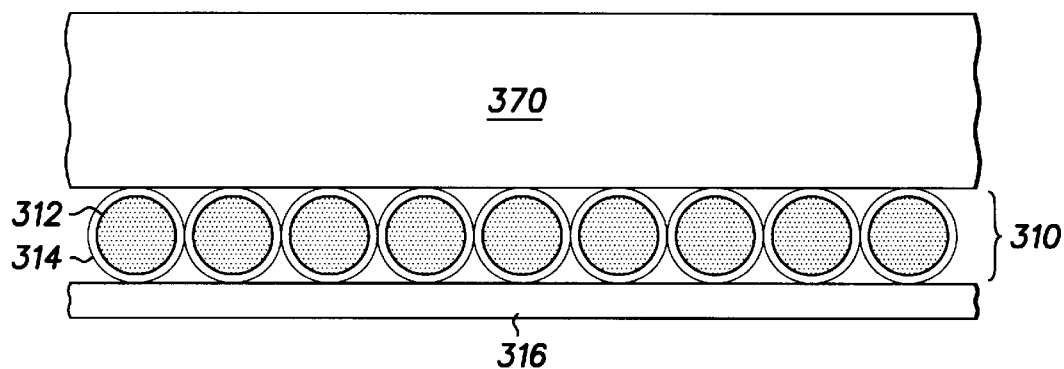

For example, as illustrated in FIG. 3, an anode plate 320 includes a conductive coating 316 being formed on a layer of a stabilized sulfide phosphor 310, which includes a sulfide phosphor core 312 and a stabilized surface 314. Conductive coating 316 may include a thin coating of aluminum, having a thickness which, in general, depends upon the voltage of the display, and is about 500 angstroms. Stabilized sulfide phosphor 310 is made in the manner described with reference to FIG. 2.

Figure 4:
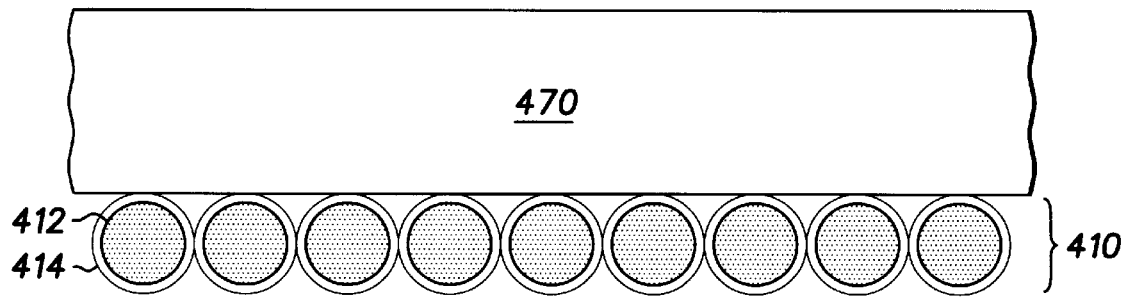

Referring now to FIG. 4, there is depicted a greatly enlarged, cross-sectional view of an anode plate 420 including a stabilized sulfide phosphor 410, in accordance with the present invention. Stabilized sulfide phosphor 410 is disposed upon a transparent substrate 470 and adhered thereto by adhesion means known to one skilled in the art, including static charge adhesion and inorganic binders, such as potassium silicate. Stabilized sulfide phosphor 410 includes a sulfide phosphor core 412 and a stabilized surface 414, which covers sulfide phosphor core 412. In this particular embodiment, stabilized surface 414 is sufficiently conductive to remove charge so that no additional conductive layer nor secondary electron collector is required to maintain a high positive potential at anode plate 420. Stabilized sulfide phosphor 410 is made by first providing a cathodoluminescent sulfide phosphor, as described with reference to FIG. 2. Then, stabilized surface 414 is formed by encapsulating the cathodoluminescent sulfide phosphor with a conductive material which is more thermodynamically stable against outgassing than the vacuum-unstable sulfur constituent of the cathodoluminescent sulfide phosphor. Organometallic technologies may be used to form this stable, conductive material. For example, encapsulation of the surface of sulfide phosphor core 412 with stannic oxide ($SnO_2$) provides a conductive stabilized surface 414. Stabilized surface 414 may be formed by slurring the cathodoluminescent sulfide phosphor particles in a solution of tin acetylacetonate or tin alkoxide in alcohol and then adding small amounts of water to precipitate a tin organic coating on the phosphor particles. Other variations of known organometallic technologies may be used. For example, the aforementioned precipitation process may be accelerated by addition to the solution of small amounts of acetic acid. The tin oxide coating may also be accomplished in a fluidized bed by passing through a bed comprised of the cathodoluminescent sulfide phosphor particles a carrier gas containing vapor of the tin solution and moisture.

Figure 5:
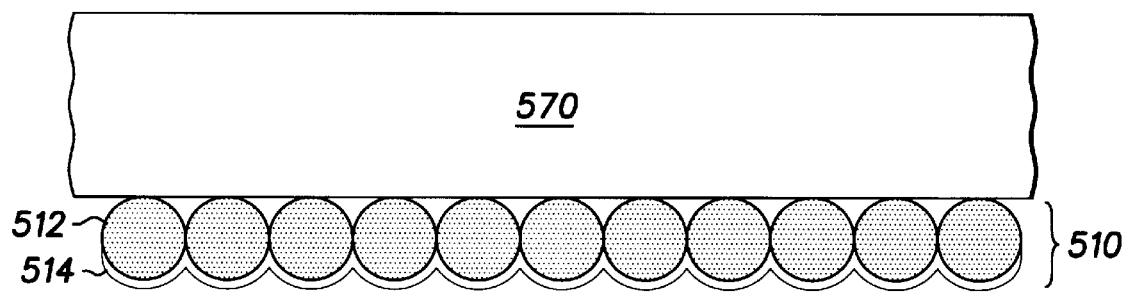

Referring now to FIG. 5, there is depicted a greatly enlarged, cross-sectional view of an anode plate 520 including a stabilized sulfide phosphor 510, in accordance with the present invention. In this particular embodiment, stabilized sulfide phosphor 510 includes a sulfide phosphor core 512 which is affixed to a transparent substrate 570. Stabilized sulfide phosphor 510 further includes a stabilized surface 514 which comprises the electron-receiving surface of stabilized sulfide phosphor 510. Stabilized sulfide phosphor 510 is formed by first affixing a cathodoluminescent sulfide phosphor to transparent substrate 570 by phosphor adhesion means known to one skilled in the art, including static charge adhesion and inorganic binders, such as potassium silicate. Thereafter, a material, which is more thermodynamically stable against outgassing than the vacuum-unstable sulfur constituent of the cathodoluminescent sulfide phosphor, is formed on sulfide phosphor core 512. For example, a gaseous source of a stable oxide may be provided to coat the exposed surfaces of the cathodoluminescent sulfide phosphor by chemical vapor deposition or metal organic chemical vapor deposition. Examples of suitable gaseous sources includes silane, disiloxane, and tetra-ethyl-orthosilicate. If stabilized sulfide phosphor 510 is conductive, it is connected to an external, grounded electrical contact for bleeding off charge; if stabilized sulfide phosphor 510 is not conductive, a plurality of secondary electron collectors may be included, in the manner described with reference to FIG. 2 or a conductive layer may be formed thereon, in the manner described with reference to FIG. 3. During the operation of anode plate 520, electrons are received by stabilized surface 514. The absence of sulfur within stabilized surface 514 prevents sulfur desorption. The electrons traverse stabilized surface 514, which comprises a dead layer, the thickness of which is predetermined to mitigate energy loss by the electrons upon traversing stabilized surface 514. A suitable voltage drop is about 300 eV. An application of anode plate 520 includes use for an anode plate in a field emission display, such as FED 100 (FIG. 1). In this application, electrons arrive at stabilized sulfide phosphor 510 having an energy within a range of about 3000–5000 eV, so that the drop in phosphor efficiency due to stabilized surface 514 is minimal. Thereafter, the electrons excite the photoactive centers of sulfide phosphor core 512, causing them to emit light.

An approach similar to that described with reference to FIGS. 2–5 is applicable to the formation of a stabilized oxide phosphor, in accordance with the present invention. A stabilized oxide phosphor includes an oxide phosphor core and a stabilized surface covering the oxide phosphor core. The oxide phosphor core contains vacuum-unstable oxygen which is prevented from outgassing due to the dead layer comprised by the stabilized surface. The stabilized surface does not include vacuum-unstable oxygen and does include a material which is more thermodynamically stable against outgassing than the vacuum-unstable oxygen constituent of the oxide phosphor core, thereby preventing oxygen outgassing at a solid-vacuum interface during electronic bombardment of the stabilized oxide phosphor. The stabilized oxide phosphor is made by first providing a cathodoluminescent oxide phosphor having a vacuum-unstable oxygen constituent. These cathodoluminescent oxide phosphors are known to one skilled in the art and include, but are not limited to: $Y_2O_3$:Eu; $Y_3Al_5O_{12}$:Tb; $Y_2SiO_5$:Ce; and rear earth oxyhalides, $R_2O_2H$:A, wherein R is a host being selected from the group consisting of Sc, Y, La, Gd, Lu, and combinations thereof, H is a halide, and A is an activator being selected from the group consisting of Eu, Sm, Pr, Dy, Tb, Ho, Er, Tm, Nd, and Yb. These oxide phosphors are known to degrade at the solid-vacuum interface upon electron bombardment, which causes the weak oxygen bond to break, resulting in the surface desorption of the oxygen constituent. This degradation process is prevented by either modifying the surface of the cathodoluminescent oxide phosphor to form a more thermodynamically stable material, or by encapsulating the cathodoluminescent oxide phosphor with an impervious material which is more thermodynamically stable against outgassing than the vacuum-unstable oxygen constituent of the cathodoluminescent oxide phosphor. In this manner, oxygen outgassing at a solid-vacuum interface is prevented during electronic bombardment of the stabilized oxide phosphor. For example, the stabilized surface may be formed by encapsulating the cathodoluminescent oxide phosphor with a stable oxide being selected from the group consisting of gallates, chromates, vanadates, silicates, and stannic oxide. Another suitable method for forming a stabilized oxide phosphor includes modifying the surface of the cathodoluminescent oxide phosphor. For example, the surface can be reacted with an oxide being selected from the group consisting of $HfO_2$, $TiO_2$, $ZrO_2$, $SnO_2$, $GeO_2$, $Al_2O_3$, and MgO. In another example, the surface of the oxide phosphor $Y_3Al_5O_{12}$:Tb is converted to the more thermodynamically stable material $Y_2SiO_5$:Tb by reacting the oxide phosphor with a silicate. A stabilized oxide phosphor having a non-conductive stabilized surface can be configured as described with reference to FIG. 2, wherein the stabilized oxide phosphor is disposed within wells defined by a plurality of secondary electron collectors. Alternatively, as described with reference to FIG. 3, a conductive layer may be formed on a layer of the stabilized oxide phosphor. A stabilized oxide phosphor having a conductive stabilized surface may be formed, in the manner described with reference to FIG. 4, by encapsulating a cathodoluminescent oxide phosphor with stannic oxide. A stabilized oxide phosphor and a stabilized sulfide phosphor, in accordance with the present invention, may be employed in a single display device. For example, the stabilized oxide phosphor may provide emission at a first wavelength, and the stabilized sulfide phosphor may provide emission at a wavelength different from the first wavelength, thereby providing different colors.

While We have shown and described specific embodiments of the present invention, further modifications and improvements will occur to those skilled in the art. We desire it to be understood, therefore, that this invention is not limited to the particular forms shown, and We intend in the appended claims to cover all modifications that do not depart from the spirit and scope of this invention.

We claim:

1. A field emission display comprising:

a cathode plate having a plurality of field emitters;

an anode plate opposing the cathode plate to define an interspace region therebetween, the interspace region being evacuated to define a vacuum therein; and a stabilized sulfide phosphor disposed on the anode plate in communication with the interspace region and disposed to receive electrons from the plurality of field emitters, the stabilized sulfide phosphor having a sulfide phosphor core including vacuum-unstable sulfur and an outer surface, the stabilized sulfide phosphor further having a stabilized surface including a more thermodynamically stable material being more thermodynamically stable against outgassing than the vacuum-unstable sulfur of the sulfide phosphor core, the stabilized surface being disposed on at least a portion of the outer surface of the sulfide phosphor core, so that electrons received at the stabilized sulfide phosphor are received at the stabilized surface thereof whereby the stabilized surface ameliorates degradative sulfur outgassing from the sulfide phosphor core thereby reducing sulfur contamination of the plurality of field emitters.

2. The field emission display as claimed in claim 1, wherein the stabilized surface of the stabilized sulfide phosphor defines an electron energy loss and has a thickness that is sufficient to prevent outgassing of the vacuum-unstable sulfur and that mitigates the electron energy loss across the stabilized surface.

3. The field emission display as claimed in claim 2, wherein the stabilized surface of the stabilized sulfide phosphor has a thickness within a range of 0.01–0.2 micrometers.

4. The field emission display as claimed in claim 1, wherein, at the stabilized surface of the stabilized sulfide phosphor, the vacuum-unstable sulfur is replaced with a more thermodynamically stable constituent being more thermodynamically stable against outgassing than the vacuum-unstable sulfur of the sulfide phosphor core.

5. The field emission display as claimed in claim 4, wherein the more thermodynamically stable constituent includes an anion being selected from the group consisting of phosphate, gallate, chromate, vanadate, silicate, and stannate.

6. The field emission display as claimed in claim 1, wherein the more thermodynamically stable material encapsulates the sulfide phosphor core and includes an oxide being selected from the group consisting of gallates, chromates, vanadates, silicates, and stannic oxide.

7. The field emission display as claimed in claim 1, wherein the sulfide phosphor core of the stabilized sulfide phosphor includes a sulfide phosphor being selected from the group consisting of zinc sulfide; rare earth oxysulfides, $R_2O_2S:A$, wherein R is a host being selected from the group consisting of Sc, Y, La, Gd, Lu, and combinations thereof and A is an activator being selected from the group consisting of Eu, Sm, Pr, Dy, Tb, Ho, Er, Tm, Nd, and Yb; and alkaline earth thiogallates, $AE(Ga, 3A)_2S_4:A$, wherein AE is an alkaline earth element being selected from the group consisting of Mg, Ca, Sr, Ba, and combinations thereof, 3A is Al or In, and A is an activator being selected from the group consisting of Eu, Ce, and Mn.

8. A field emission display comprising:

a cathode plate having a plurality of field emitters;

an anode plate opposing the cathode plate to define an interspace region therebetween, the interspace region being evacuated to define a vacuum therein; and a stabilized oxide phosphor disposed on the anode plate in communication with the interspace region and disposed to receive electrons from the plurality of field emitters, the stabilized oxide phosphor having an oxide phosphor core including vacuum-unstable oxygen and an outer surface, the stabilized oxide phosphor further having a stabilized surface including a more thermodynamically stable material being more thermodynamically stable against outgassing than the vacuum-unstable oxygen of the oxide phosphor core, the stabilized surface being disposed on at least a portion of the outer surface of the oxide phosphor core, so that electrons received at the stabilized oxide phosphor are received at the stabilized surface thereof whereby the stabilized surface prevents degradative oxygen outgassing from the oxide phosphor core thereby reducing oxygen contamination of the plurality of field emitters.

9. The field emission display as claimed in claim 8, wherein the stabilized surface of the stabilized oxide phosphor defines an electron energy loss and has a thickness that is sufficient to prevent outgassing of the vacuum-unstable oxygen and that mitigates the electron energy loss across the stabilized surface.

10. The field emission display as claimed in claim 9, wherein the stabilized surface of the stabilized oxide phosphor has a thickness within a range of 0.01–0.2 micrometers.

11. The field emission display as claimed in claim 8, wherein the more thermodynamically stable material encapsulates the oxide phosphor core and includes an oxide being selected from the group consisting of gallates, chromates, vanadates, silicates, and stannic oxide.

12. The field emission display as claimed in claim 8, wherein the oxide phosphor core of the stabilized oxide phosphor includes an oxide phosphor being selected from the group consisting of $Y_2O_3$:Eu; $Y_3Al_5O_{12}$:Tb; $Y_2SiO_5$:Ce; and rare earth oxyhalides, $R_2O_2H:A$, wherein R is a host being selected from the group consisting of Sc, Y, La, Gd, Lu, and combinations thereof, H is a halide, and A is an activator being selected from the group consisting of Eu, Sm, Pr, Dy, Tb, Ho, Er, Tm, Nd, and Yb.

13. The field emission display as claimed in claim 1, further comprising a plurality of secondary electron collectors disposed on the anode plate, the plurality of secondary electron collectors defining a plurality of wells, the stabilized sulfide phosphor disposed within the plurality of wells.

14. The field emission display as claimed in claim 13, wherein the plurality of wells have a depth and the stabilized sulfide phosphor has a thickness, the thickness of the stabilized sulfide phosphor being less than the depth of the plurality of wells.

15. The field emission display as claimed in claim 13, wherein the plurality of secondary electron collectors are conductive.

16. The field emission display as claimed in claim 13, wherein the plurality of secondary electron collectors define a planar surface, and further comprising a conductive film disposed on the planar surface defined by the plurality of secondary electron collectors.

17. The field emission display as claimed in claim 8, further comprising a plurality of secondary electron collectors disposed on the anode plate, the plurality of secondary electron collectors defining a plurality of wells, the stabilized oxide phosphor disposed within the plurality of wells.

18. The field emission display as claimed in claim 17, wherein the plurality of wells have a depth and the stabilized oxide phosphor has a thickness, the thickness of the stabilized oxide phosphor being less than the depth of the plurality of wells.

19. The field emission display as claimed in claim 17, wherein the plurality of secondary electron collectors are conductive.

20. The field emission display as claimed in claim 17, wherein the plurality of secondary electron collectors define a planar surface, and further comprising a conductive film disposed on the planar surface of the plurality of secondary electron collectors.

* * * * *